United States Patent [19]
Philipps

[11] Patent Number: 6,139,203
[45] Date of Patent: Oct. 31, 2000

[54] DEVICE FOR OPENING AND CLOSING A FILM CARTRIDGE CLOSURE

[75] Inventor: Bernd Philipps, Untergruppenbach, Germany

[73] Assignee: Eastman Kodak Company, Rochester, N.Y.

[21] Appl. No.: 09/390,528

[22] Filed: Sep. 3, 1999

[30] Foreign Application Priority Data

Sep. 9, 1998 [DE] Germany .................... 198 41 072

[51] Int. Cl.$^7$ .................................................. G03B 17/26
[52] U.S. Cl. ........................................... 396/513; 396/538
[58] Field of Search .................................. 396/513, 512, 396/514, 535–538

[56] References Cited

U.S. PATENT DOCUMENTS

| | | | |
|---|---|---|---|
| 5,737,659 | 4/1998 | Stiehler et al. | 396/513 |
| 5,809,359 | 9/1998 | Taku | 396/513 |

FOREIGN PATENT DOCUMENTS

| | | | |
|---|---|---|---|
| 0 691 573 A1 | 1/1996 | European Pat. Off. | G03D 13/00 |
| 0 770 901 A1 | 5/1997 | European Pat. Off. | G03B 17/26 |
| 0 770 917 A1 | 5/1997 | European Pat. Off. | G03D 13/00 |

*Primary Examiner*—D. Rutledge
*Attorney, Agent, or Firm*—James D. Leimbach

[57] ABSTRACT

The invention refers to a device (30) for opening and closing a film cartridge closure (311) of a film cartridge (31), with which opening and closing of the film cartridge closure can be made possible independently of active drive or power transfer elements, such as a motor and linkage. According to the present invention, this is achieved in that a stationary film cartridge holder has a shaft, for opening and closing the film cartridge closure (311), which is mounted so as to displace through a displacement travel (L) in the axial direction; and means (4, 5) are provided with which the shaft (1) is positively guided in such a way that a displacement through the displacement travel (L) results in a rotation of the shaft through 90 degrees.

6 Claims, 3 Drawing Sheets

DEVICE FOR OPENING AND CLOSING A FILM CARTRIDGE CLOSURE

FIELD OF THE INVENTION

The present invention relates to the Advanced Film Cartridge format, and more specifically to a device for opening and closing the film cartridge.

BACKGROUND OF THE INVENTION

For further processing of exposed APS (Advanced Photo System) photographic films, for example for the making of prints, devices are known with which the films are wound out of the film cartridge and, after processing, wound back onto the spool of the film cartridge. Film cartridge holders which comprise a stationary support element equipped with a drive and linkage block, and a displaceable support element, are used for this purpose. The latter support element has a pin for supporting the film spool, a feeler for status querying as to whether the film cartridge contains a developed or undeveloped film and a further support pin which engages into the hollow shaft of the film cartridge closure. By displacement of the movable support element, a shaft located on the stationary support element for driving the film spool of the cartridge, and a shaft for opening and closing the film cartridge closure, are brought into engagement with openings provided therefor in the film cartridge. To open the film cartridge closure consisting of a light-tight flap, the latter must be rotated 90 degrees, which is accomplished by rotating the shaft provided therefor.

European Patent Application 0 770 901 A1 discloses a film winding device in which winding drive is accomplished by way of a motor-driven shaft which is brought into engagement with the spool of the film cartridge. Rotation of the flap of the film cartridge closure is accomplished by picking off the rotary motion of the driven shaft via a coupling and a linkage. Similar solutions are known from European Patent Applications 0 691 573 A1 and 0 770 917 A1. Such solutions are disadvantageous in that a power transfer element in the form of a linkage is always needed, thus making the entire design complex and expensive. In addition, couplings (in this case usually friction couplings) are used to connect and disconnect the power transfer, so that the reliability, in particular, of such devices is reduced due to the greater wear on the constituents that are used.

SUMMARY OF THE INVENTION

It is the object of the invention to provide a device for opening and closing a film cartridge closure which is of simple design and with which opening and closing can be made possible independently of active drive or power transfer elements, such as a motor and linkage.

The object is achieved by way of a for opening and closing a film cartridge comprising a film cartridge receptacle with a stationary film cartridge holder provided with a drive and linkage block and a displaceable film cartridge holder, the stationary holder having respectively a shaft for opening and closing the film cartridge closure. A shaft is placed in working engagement with the drive and linkage block, for driving the film cartridge spool, and the displaceable holder having respective support elements for supporting the film cartridge. The shaft is mounted to be displaced through a displacement travel distance in the axial direction and means for positively guiding the shaft such that a displacement through the displacement travel distance results in a rotation of the shaft through 90 degrees.

The approach according to the present invention carries out, in simple fashion, the conversion of a linear motion into a rotary motion, no linkages or separate drives being necessary to open and close a film cartridge closure. Further details and advantages of the invention are evident from the dependent claims and from the description of an exemplifying embodiment.

The invention, and its objects and advantages, will become more apparent in the detailed description of the preferred embodiments presented below.

DETAILED DESCRIPTION OF THE INVENTION

Figure 1:
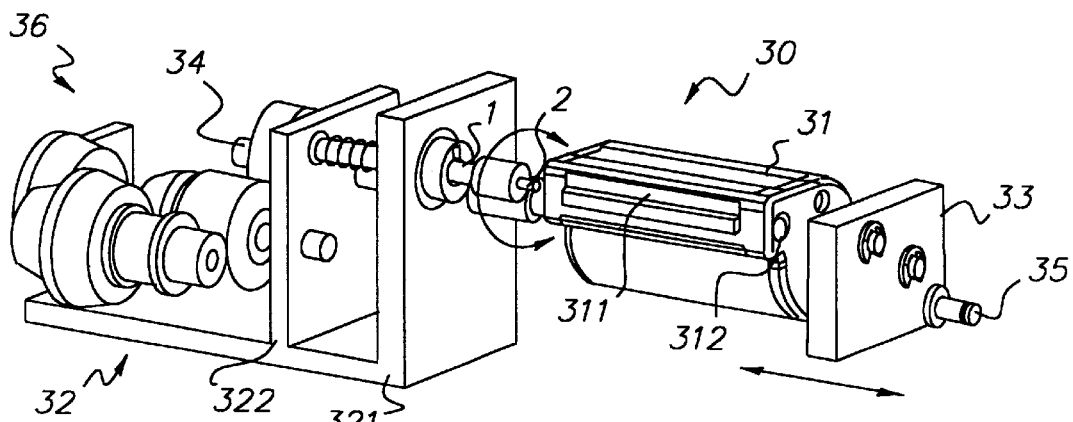
FIG. 1 shows a perspective view of an APS film cartridge receptacle having a device according to the present invention that is not in engagement with a film cartridge.

The device according to the present invention is utilized in a film cartridge receptacle 30 for an APS film cartridge 31, which is constituted by a stationary film cartridge holder 33 equipped with a linkage block 36, and a film cartridge holder 35 that is displaceable in the direction of arrow A in FIG. 1, the mechanism for displacing holder 33 not being depicted. Displaceable film cartridge holder 33 has a support pin 341 for supporting the film spool, a feeler 35 for status querying as to whether the film cartridge contains a developed or undeveloped film, and a support pin 11 which engages into hollow shaft 312 of a film cartridge closure 311 of film cartridge 31. Stationary film cartridge holder 32, comprising a base plate and a first and a second housing wall 321 and 322, carries a shaft 34, drivable via a stepping motor (not depicted) and linkage block 36, for driving the film spool; an ejector 37, preloaded via a spring 371, for removing film cartridge 31 from the receptacle; and the device according to the present invention. As is evident from the sectioned depiction of FIG. 3, the device according to the present invention is constituted by a shaft 1 at whose tip a stop element 3 equipped with a mandrel 2 is mounted, a guide element 4 arranged immovably in first housing wall 321, a helical spring guided through shaft 1 and bracing between second housing wall 322 and a bracing element 8 attached on shaft 1, and a stop 9 for shaft 1. Guide element 4, shaped as a hollow cylinder, has on the inner wall a helically recessed groove 5 into which engages a pin 6 mounted on shaft 1. The pitch and length of the groove are such that when a force acts on shaft 1 in direction F to complete displacement travel L in the axial direction, mandrel 2 performs a rotary motion of 90 degrees (see FIG. 3).

Figure 2:
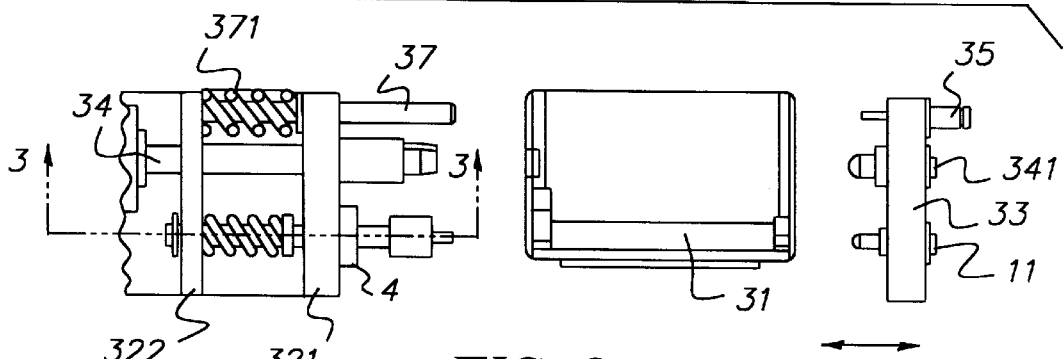
FIG. 2 shows a plan view according to FIG. 1.
Figure 3:
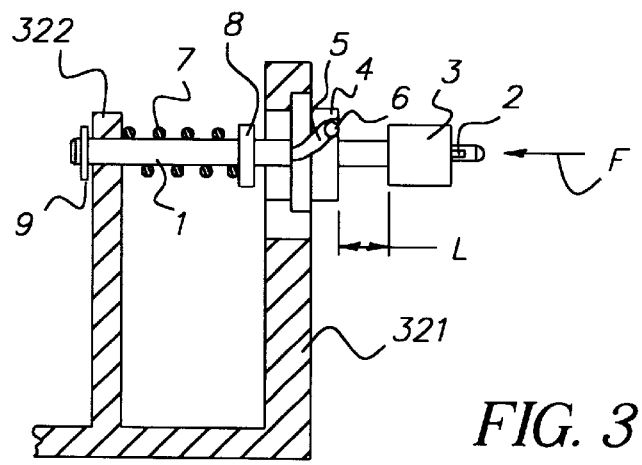
FIG. 3 shows the device according to the present invention in a depiction in section along line 3—3 of FIG. 2.
Figure 4:
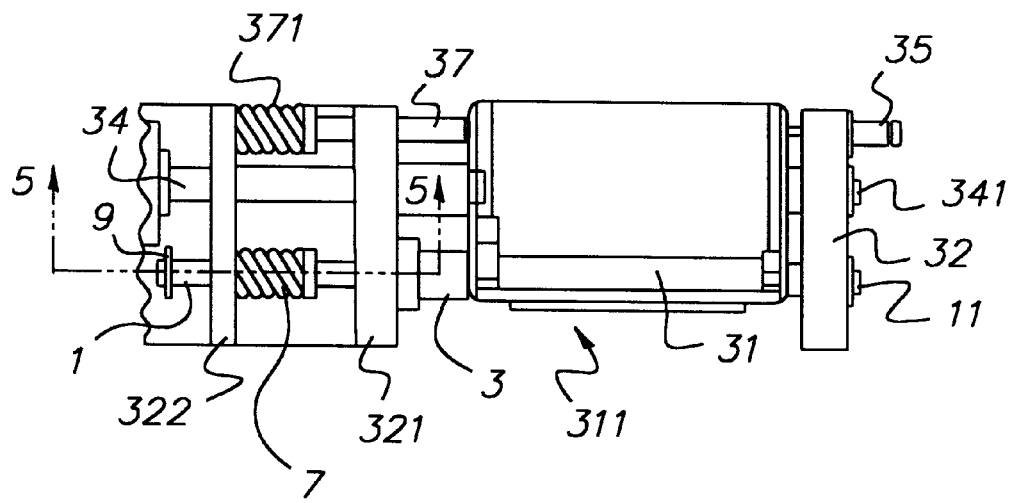
FIG. 4 shows a plane view of the APS film cartridge receptacle having a device according to the present invention that is in engagement with a film cartridge.
Figure 5:
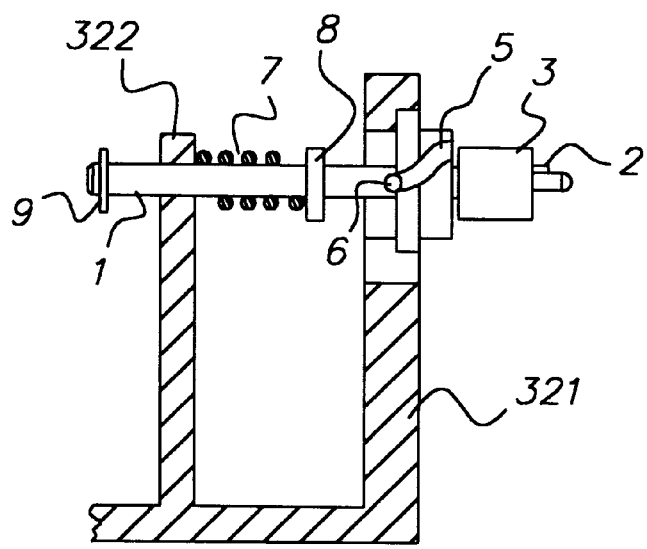
FIG. 5 shows the device according to the present invention in a depiction in section along line 5—5 of FIG. 4.
Figure 6:
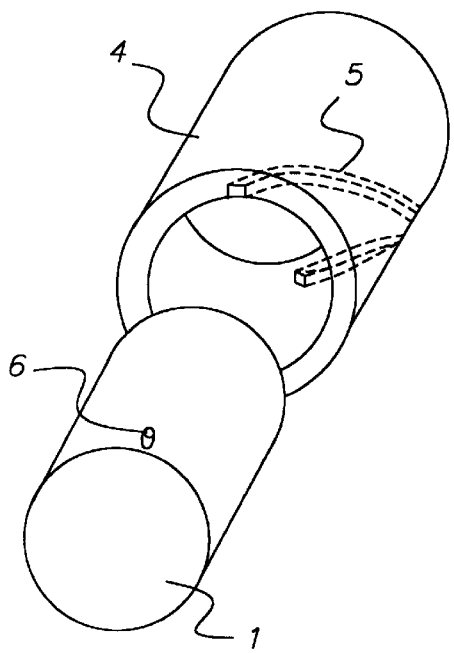
FIG. 6 shows a perspective view of a detail of the device.
Figure 7:
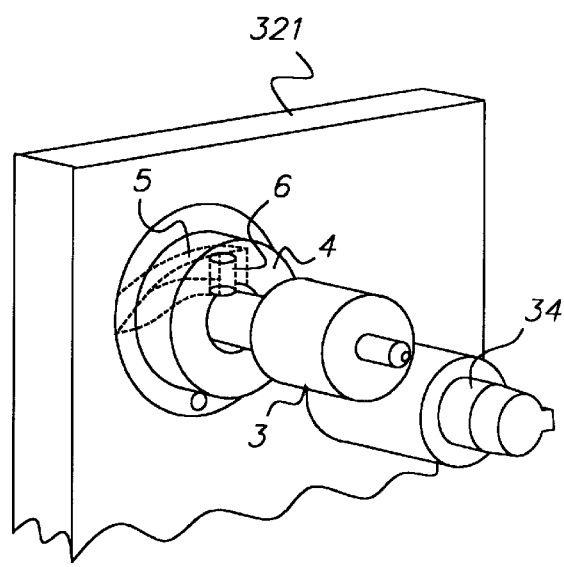
FIG. 7 shows a perspective view of a film cartridge holding element with the film cartridge closure in the closed state.
Figure 8:
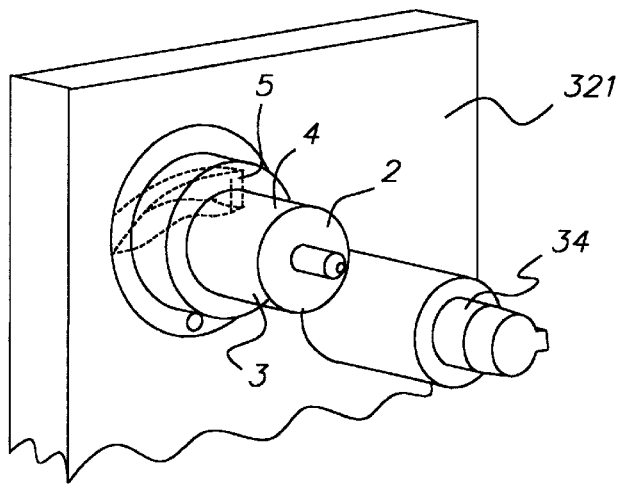
FIG. 8 shows a perspective view of a film cartridge holding element with the film cartridge closure in the open state.

Before a film cartridge 31 is placed into film cartridge receptacle 30, as depicted in FIGS. 2 and 3, springs 371 and 7 are relaxed, so that stop 9 attached to shaft 1 is braced by housing wall 322. Displacement of film cartridge holder 33 toward film cartridge holder 32 in the direction of arrow A causes support pins 341 and 11 and feeler 35, as well as shafts 34 for driving the cartridge's film spool and mandrel 2 of shaft 1 for opening and closing the film cartridge closure, to be brought into engagement with the openings provided therefor in the film cartridge. As soon as the lateral surface of the film cartridge touches stop 3, film cartridge holder 33 must be pushed against the spring force of spring 7. Because of the positive guidance, effected by groove 5, of pin 6 mounted on shaft 1, a rotation of mandrel 2 (and thus of peg 21 arranged thereon) occurs in accordance with the pitch of the groove, transferring the rotation to the hollow shaft of the film cartridge closure. Once stop 3 reaches guide element 4, i.e. once displacement travel L according to FIG. 3 has been completed and the state shown in FIGS. 4 and 5 has been reached, shaft 1 has performed a 90-degree rotation. The film cartridge closure or film mouth is completely open. After processing of the film, film cartridge holder 33 is moved back in the opposite direction so that the relaxation of spring 1 rotates shaft 1 back into its initial position and the film cartridge closure is thereby closed again. The film cartridge is then ejected by ejector 37.

The foregoing description details the preferred embodiment of the invention. Variations of the preferred embodiment will be readily apparent to those skilled within the art, accordingly the scope of the present invention should be measured by the appended claims.

Parts List

1 Shaft for opening and closing the film cartridge closure
2 Mandrel for actuating the film cartridge closure
3 Stop element
4 Guide element
5 Groove
6 Pin
7 Spring
8 Spring bracing element
9 Stop (for shaft 1)
11 Support element (for hollow shaft 312) of the film cartridge closure
30 Film cartridge receptacle
31 Film cartridge
311 Film cartridge closure
312 Hollow shaft of the film cartridge closure
32 Film cartridge holder with drive and linkage block
321 First housing wall
322 Second housing wall
33 Displaceable (in arrow direction A) film cartridge holder
34 Shaft for film spool drive
341 Support pin
35 Feeler
36 Linkage block
37 Ejector for film cartridge
371 Spring
L Max. displacement length of shaft 1

What is claimed is:

1. A device for opening and closing a film cartridge comprising;

a film cartridge receptacle with a stationary film cartridge holder provided with a drive and linkage block and a displaceable film cartridge holder, the stationary holder having respectively a shaft for opening and closing the film cartridge closure;

a shaft, in working engagement with the drive and linkage block, for driving the film cartridge spool, and the displaceable holder having respective support elements for supporting the film cartridge, such that the shaft is mounted so as to displace through a displacement travel in the axial direction; and means for positively guiding the shaft such that a displacement through the displacement travel results in a rotation of the shaft through 90 degrees.

2. The device according to claim 1 wherein the means for positively guiding further comprise the shaft being formed by a hollow cylindrical guide element having a groove recessed in helical form on its inner side, and a pin arranged on the shaft, the pin being guided in the groove.

3. The device according to claim 2, further comprising the guide element is joined non-rotatably to a housing wall of the film cartridge holder.

4. The device according to claim 2, further comprising the groove having a pitch such that the shaft can be displaced through the displacement travel in the axial direction.

5. The device according to claim 1, further comprising the shaft being preloaded in the axial direction by a helical spring, and spring bracing is accomplished via a housing wall of the film cartridge holder and a spring bracing element arranged on the shaft.

6. The device according to claim 5, further comprising the shaft in the preloaded state is braced by way of a stop against a housing wall of the film cartridge holder.

* * * * *